T. L. RANKIN.
VALVES FOR ICE-MACHINES.
No. 185,578. Patented Dec. 19, 1876.
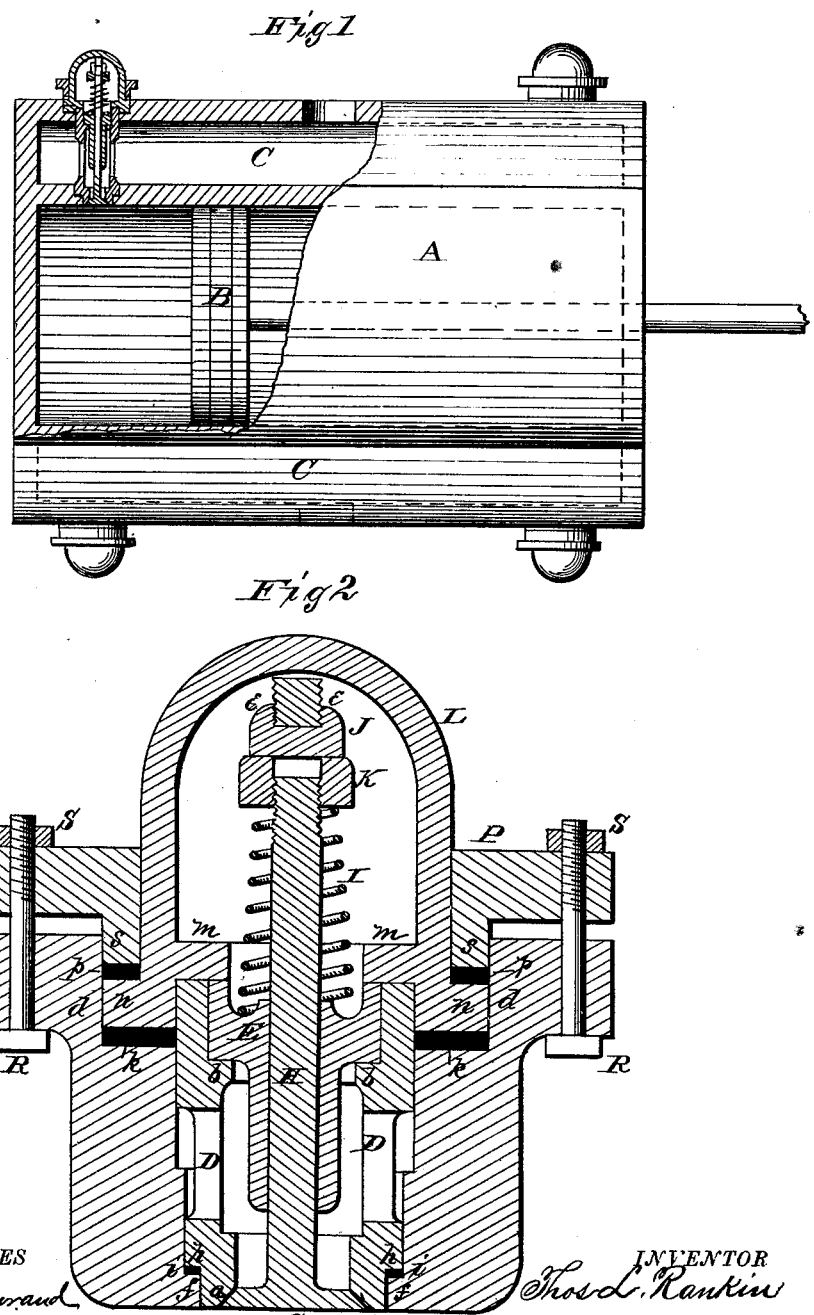

UNITED STATES PATENT OFFICE.

THOMAS L. RANKIN, OF EMPORIA, KANSAS.

IMPROVEMENT IN VALVES FOR ICE-MACHINES.

Specification forming part of Letters Patent No. 185,578, dated December 19, 1876; application filed June 7, 1876.

*To all whom it may concern:*

Be it known that I, THOMAS L. RANKIN, of Emporia, in the county of Lyon, and in the State of Kansas, have invented certain new and useful Improvements in Valves for Ice-Machines; and do hereby declare that the following is a full, clear, and exact description thereof, reference being had to the accompanying drawings, and to the letters of reference marked thereon, making a part of this specification.

The nature of my invention consists in the construction and arrangement of a valve for ice-machines, as will be hereinafter more fully set forth.

In order to enable others skilled in the art to which my invention appertains to make and use the same, I will now proceed to describe its construction and operation, referring to the annexed drawing, in which—

Figure 1 is a view showing the pump used in ice-machines, with my valves attached thereto. Fig. 2 is an enlarged longitudinal section of the valve.

A represents the pump-cylinder, with piston B moving therein. On opposite sides of the cylinder are two passages, C C, extending the entire length of the cylinder. In each end of these passages is placed one of my valves, those at two diagonally-opposite points being inlet-valves, and the other two discharge-valves.

In Fig. 2 I have shown one of the inlet-valves, which open into the pump-cylinder.

D represents the valve-cage, formed with the seat $a$ at its inner end, and provided with a guide, E, for the valve-stem. This guide is constructed, as shown in the drawing, resting upon a shoulder, $b$, in the cage. The cage and guide are turned by machinery, so as to make a perfect and close fit. G is the valve fitting on the seat $a$, and provided with the stem H, which passes through the guide E. Around this stem, above the guide, is placed a spiral spring, I, which rests in a recess on the guide, and a nut, K, is then screwed on the end of the valve-stem for the spring to act against and hold the valve closed. In the end of the stem is a slot or mortise for the passage of a key, J, which has projections $e$ on its upper edge at the ends. The nut K must be screwed up sufficiently to allow the key J to be inserted in the slot, and the key is then pressed up, so that the projections $e$ grasp the stem, as shown, when the nut K is run back to the key, preventing the latter from coming out.

In the outer side of the chamber C is made an annular recess, $d$, around the opening, in which the cage D fits, and in the bottom of said chamber, which is virtually the cylinder of the pump, is formed a shoulder, $f$. On the exterior of the cage D, near the valve-seat, is formed a corresponding shoulder, $h$, to rest on the shoulder $f$, with a rubber ring or gasket, $i$, placed between them.

In the bottom of the recess $d$ is placed a rubber ring, $k$, and a cap or inverted bowl, L, is then placed in the recess over the valve-stem. This cap is provided with an interior flange, $m$, which comes on top of the cage, and overlaps the edge of the guide. On the outside of the cap, at the lower end, is another flange, $n$, to fill the recess $d$. On top of this flange is placed another rubber ring, $p$.

P is a plate, with central aperture large enough to pass over the cap L, around which aperture, on the under side of the plate, is a flange, $s$, to fit into the recess $d$ above the flange $n$ and ring $p$. Through suitable ears on opposite sides of the chamber C are passed two bolts, R R, which also pass up through the ends of the plate P, when nuts S are screwed upon their ends.

It will thus be seen that by simply tightening two nuts, all the parts of the valve are tightened, so as to make perfectly gas-tight joints. The various parts of the valve are turned by machinery constructed for the purpose.

Having thus fully described my invention, what I claim as new, and desire to secure by Letters Patent, is—

1. The combination of the valve-stem H, spring I, nut K, and the key J, with projections $e$ $e$, substantially and for the purpose herein set forth.

2. The valve-cage D, provided with the loose-turned guide E, as herein set forth.

3. The combination of the chamber C, having shoulder $f$ and recess $d$, the valve-cage D, with shoulder $h$, the guide E, cap L, with flanges *m n*, the plate P, with flange *s*, and the rubber packing-rings *i k p*, all constructed as described, and the whole firmly united together by the two bolts R R and nuts S S, substantially as and for the purposes herein set forth.

In testimony that I claim the foregoing I have hereunto set my hand this 24th day of April, 1876.

THOS. L. RANKIN.

Witnesses:
C. HOOD,
P. B. PLUMB.